United States Patent
Grasshoff et al.

(10) Patent No.: US 6,879,871 B2
(45) Date of Patent: Apr. 12, 2005

(54) ADVANCED PROCESS CONTROL FOR A MANUFACTURING PROCESS OF A PLURALITY OF PRODUCTS WITH MINIMIZED CONTROL DEGRADATION AFTER RE-INITIALIZATION UPON OCCURRENCE OF RESET EVENTS

(75) Inventors: Gunter Grasshoff, Radebeul (DE); Jan Raebiger, Dresden (DE); André Holfeld, Schirgiswalde (DE)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 10/283,891

(22) Filed: Oct. 30, 2002

(65) Prior Publication Data

US 2003/0204278 A1 Oct. 30, 2003

(30) Foreign Application Priority Data

Apr. 30, 2002 (DE) .......................................... 102 19 363

(51) Int. Cl.[7] .............................................. G06F 19/00
(52) U.S. Cl. ........................... 700/121; 700/12; 700/29; 702/187
(58) Field of Search .............................. 700/12, 29–30, 700/51, 96, 97, 121, 108; 702/187

(56) References Cited

U.S. PATENT DOCUMENTS 5,365,423 A * 11/1994 Chand ........................ 364/140

2002/0002414 A1 * 1/2002 Hsiung et al. ................. 700/95
2002/0116083 A1 * 8/2002 Schulze ....................... 700/108

FOREIGN PATENT DOCUMENTS

DE 199 46 607 A1 5/2001 ........... G05B/17/00
DE 10120701 A1 10/2002 ........... H01L/21/66

* cited by examiner

Primary Examiner—Leo Picard
Assistant Examiner—Sean Shechtman
(74) Attorney, Agent, or Firm—Williams, Morgan & Amerson, P.C.

(57) ABSTRACT

In a method and in a controller for an advanced process control one or more currently valid process states are stored and are compared, upon the occurrence of a reset event, with a subsequent valid process state that has been established after the re-initialization of the process controller. Upon comparison of the previously established process state, including the associated history information to the process state established after occurrence of the reset event on the basis of the newly gathered history information, it is decided whether or not a reset of the process controller has been necessary. If it is assessed that a reset has not been necessary, process control is continued on the basis of the previously established process state and possibly the presently valid process state and the relevant history information. In this way, process accuracy rapidly converges after a reset event has occurred and resetting the process controller is only performed in cases where the reset event has entailed a significant change in any of the involved process components.

40 Claims, 5 Drawing Sheets

ADVANCED PROCESS CONTROL FOR A MANUFACTURING PROCESS OF A PLURALITY OF PRODUCTS WITH MINIMIZED CONTROL DEGRADATION AFTER RE-INITIALIZATION UPON OCCURRENCE OF RESET EVENTS

BACKGROUND OF THE INVENTION

1. Field of the Invention

The present invention generally relates to the field of advanced process control of manufacturing processes, such as processes for producing semiconductor products, wherein an improved process control quality is achieved by adjusting process parameters on the basis of a process model and information related to, for example, the product, the type of process, the process tool to be used, and the like, to determine a process state describing the expected effect of the process on the product.

2. Description of the Related Art

Today's global market forces manufacturers of mass products to offer high quality products at a low price. It is thus important to improve yield and process efficiency to minimize production costs. This holds especially true in the field of semiconductor fabrication, since here it is essential to combine cutting-edge technology with mass production techniques. It is, therefore, the goal of semiconductor manufacturers to reduce the consumption of raw materials and consumables while at the same time improving process tool utilization. The latter aspect is especially important, since in modern semiconductor facilities, equipment is required which is extremely cost-intensive and represents the dominant part of the total product costs. For example, in manufacturing modern integrated circuits, 500 or more individual processes may be necessary to complete the integrated circuit, wherein failure in a single process step may result in the loss of the complete integrated circuit. This problem is even exacerbated in that the size of the substrate, on which a plurality of such integrated circuits are processed, steadily increases, so that failure in a single process step may entail the loss of a large number of products. Therefore, the various manufacturing stages have to be thoroughly monitored to avoid undue waste of tool operation time and raw materials. Ideally, the effect of each individual process step on each substrate would be detected by measurement and the substrate under consideration would be released for further processing only if the required specifications were met. A corresponding process control, however, is not practical, since measuring the effects of certain processes may require relatively long measurement times or may even necessitate the destruction of the sample. Moreover, immense effort, in terms of time and equipment, would have to be made on the metrology side to provide for the required measurement results. Additionally, utilization of the process tool would be minimized since the tool would be released only after the provision of the measurement result and its assessment.

The introduction of statistical methods, i.e., mean values, etc., for adjusting process parameters significantly relaxes the above problem and allows a moderate utilization of the process tools while attaining a relatively high product yield. Nevertheless, in total, a large number of dummy substrates or pilot substrates may be necessary to adjust process parameters of respective process tools, wherein tolerable parameter drifts during the process have to be taken into consideration when designing a process sequence. This criterion is often referred to as the process capability for the process under consideration.

Recently, a process control strategy has been introduced and is continuously improved, allowing a high degree of process control, desirably on a run-to-run basis, without the necessity of an immediate response of a measurement tool. In this control strategy, the so-called advanced process control, a model of a process or of a group of interrelated processes is established and implemented in an appropriately configured process controller. The process controller also receives information related to the type of process or processes, the product, the process tool or process tools in which the products are to be processed, the process recipe to be used, i.e., a set of required sub-steps for the process or processes under consideration, wherein possibly fixed process parameters and variable process parameters may be contained, measurement results of previously processed products or test substrates, and the like. From this information, which may also be referred to as history information, and the process model, the process controller determines a controller state or process state that describes the effect of the process or processes under consideration on the specific product.

With reference to FIGS. 1a–1b, an illustrative example of an advanced process control (APC) will now be described. FIG. 1a schematically shows an APC architecture that is exemplified for a chemical mechanical polishing (CMP) process. A CMP station 100 comprises three individual operable CMP platens 101, 102 and 103. A process controller 110 is operatively connected to the CMP station 100. Moreover, the process controller 110 is configured to receive information from a metrology tool 120 and from the CMP tool 100. Furthermore, the process controller 110 may receive information related to a product 130 to be processed by the CMP station 100, and information related to a process recipe 140 that generally specifies the type of process to be performed on the CMP station 100.

The operation of the system shown in FIG. 1a will be explained with reference to the flowchart shown in FIG. 1b. First, in step 150, the process controller 110 is initialized, i.e., the process controller 110 is set to an initial process state. A process state in this example may represent, for instance, the removal rate at each of the CMP platens 101, 102 and 103. The process state may also represent the removal rate and the associated degree of dishing and erosion at each of the CMP platens, or may represent the total removal rate of the CMP station 100. Since, generally, the amount of history information available upon initialization of the process controller 110 may not be sufficient to determine a process state, the initial state is set in advance and selected so that the effect of the tool is expected to be within the process specifications. The product 130 is then processed with process parameters adjusted on the basis of the initial process state.

In step 155, the process controller 110 determines a process state on the basis of the process model implemented and the history information received from, for example, the metrology tool 120, the CMP station 100, a further product 130 to be processed and the corresponding process recipe. It should be noted that, in particular, the measurement results obtained from the metrology tool 120 may be delayed or may not even be available unless a plurality of products 130 is completely processed. Thus, the process controller 110 establishes the currently valid process state on the basis of the available information and the process model to "predict" the effect of the CMP process on the product to be processed and to adjust process parameters correspondingly to achieve the predicted effect. For example, the process controller 110 may estimate the wear of the polishing pads on the platens 101, 102 and 103 from the available information, such as the number of products that has already been processed, type of process to be performed and the like, and estimate the "state" of the process and correspondingly adjust a process parameter, for example, the polishing time on a specific polishing platen, to obtain the specified process result. In other processes, the process state may represent the etch rate in an etch tool, the gate length in forming a gate electrode of a MOS transistor, the deposition rate in a deposition tool, and so on.

As indicated in step 160, the determination of the process state may require the processing of one or more pilot substrates so as to improve control quality, since the accuracy of the determined process state may significantly depend on the available history information, the amount and the exactness of which increases with an increasing number of processed products.

In step 165, the process state is updated, that is, a new or advanced process state is determined on the basis of the previous process states, including the previously obtained history information. Preferably, the advanced process state is established on a run-to-run basis; that is, prior to processing an individual product 130, the corresponding process state is established, and on the basis of the currently valid process state, the process parameter(s) may accordingly be adjusted.

As indicated in step 170, the process flow continuously updates the process state when no reset event occurs. Generally, process control quality improves as the amount of history information increases, unless the history information indicates that predefined specifications are no longer met. For instance, the lifetime of a consumable has expired or will soon expire, a polishing head has to be replaced, a machine failure has occurred, the type of product is to be changed, or the process recipe, i.e., the type of process, has to be changed, and the like. Any of these events may render the process state unpredictable and, therefore, the process controller 110 is re-initialized with the initial state set in advance and the process continues as depicted in FIG. 1b on the basis of newly gathered history information after the reset event.

It should be noted that the system shown and described with reference to FIGS. 1a–1b is only an illustrative example, wherein the process controller 110 is connected to a single process station and is used in a feedback loop; however, the process controller 110 may be configured so as to perform several control operations with a plurality of different product types and process recipes, as well as with more than one process tool. Furthermore, the process controller 110 may be adapted to perform a feed forward operation, i.e., control process on the basis of history information relating to a previously completed process to adjust parameters of a subsequent process.

Although the advanced process control, as exemplarily described above, provides significant advantages compared with process controls based, for example, on measurement mean values, the occurrence of reset events conventionally requires the re-initializing of the process controller, resulting in a reduced process quality in an early state after the re-initialization and also possibly requiring the processing of additional pilot substrates.

Any re-initialization, however, reduces the process capability due to a wider range of tolerances of the process during the time period after the re-initialization, and entails a reduced throughput due to the processing of pilot wafers and a reduced yield caused by a higher probability of device failures.

It is thus highly desirable to reduce the inadvertent effect of reset events on product yield and production cost.

SUMMARY OF THE INVENTION

Generally, the present invention is directed to a method and an apparatus for significantly reducing the impact of reset events in a process line on process control quality. According to the present invention, advanced process controlling is performed, wherein a presently valid state of the process controller is determined that is based on a process model and any history information gathered so far. This state and the relevant history information is stored. Upon occurrence of a reset event, starting from the initial process state, a new currently valid process state is determined on the basis of the newly gathered history information, and by estimating the currently valid process state with respect to the stored state, a decision is made as to whether to continue the process control on the basis of the process state stored prior to the reset event or on the basis of the currently valid process state. If, therefore, a certain "similarity" between the process state stored prior to the reset event and the currently valid process state is detected, further process control will be based on the previous process state, or on a combination of the previous process state and the currently valid process state, so that the history information gathered over the relatively long time period prior to the reset event is, at least implicitly, maintained and may be merged with the history information gathered after the reset event. Thus, control quality will soon reach a high degree of accuracy. Especially when the previous process state and the currently valid process state are combined, the valuable history information characterizing the process after the reset event and the "experience" of the controller gained on the basis of the previously gathered history information are combined and process quality will not be unduly affected by the re-initialization of the controller. Thus, in those cases when the similarity between the process state prior and after the reset event is confirmed, the period of converging of the process quality after re-initialization may be significantly accelerated.

According to one embodiment of the present invention, a method for advanced process control for a manufacturing sequence of a variety of products by using a process tool comprises determining an initial process state on the basis of a process model and history information, wherein the history information includes information related to at least one of the process tool, a process recipe and the products. Moreover, a first advanced process state is determined on the basis of the initial process state and the history information, and the first advanced process state is stored. Upon occurrence of a reset event, the initial process state is re-initialized and a second advanced process state is determined on the basis of the initial process state and history information gathered after the reset event. The second advanced process state is assessed in comparison to the first advanced process state and process control is continued on the basis of the first and/or second advanced process state depending on the result of the assessment.

According to a further illustrative embodiment of the present invention, a method of controlling a manufacturing process sequence for a plurality of products performed with a process tool is provided, wherein the manufacturing process sequence includes a reset event. The method comprises providing a model for the manufacturing process sequence and gathering information related to at least one of the manufacturing process sequence, the process tool and the products. On the basis of the model and the information, an initial process state is determined that quantitatively estimates an effect of the manufacturing process sequence on the product. The initial process state is updated on the basis of the model and the information to establish a first advanced process state. The gathered information is stored and process control is continued with the initial control state after occurrence of the reset event. The initial process state is updated on the basis of the model and information gathered after the reset event in order to establish a second advanced process state. The method further includes combining the information gathered after the reset event with the stored information when a specified correlation between the first advanced process state and the second advanced process state fulfills a predefined condition, and continuing the control sequence with the second advanced process state when the specified correlation fails to fulfill the predefined condition.

According to a further embodiment of the present invention, an advanced process controller for controlling a process in producing a plurality of products comprises a history information unit configured to receive and store history information of the process, wherein the history information includes information related to at least one of the process tool, a process recipe and the product. The controller further comprises a state determination unit that is configured to determine a process state on the basis of a process model and the history information. Furthermore, a state memory is provided that is configured to store at least one process state. Moreover, the controller comprises a state assessment unit that is configured to assess a currently valid process state in comparison to a process state stored in the state memory.

BRIEF DESCRIPTION OF THE DRAWINGS

The invention may be understood by reference to the following description taken in conjunction with the accompanying drawings, in which like reference numerals identify like elements, and in which:

FIG. 3b is a simplified illustration of a typical controller architecture usable for the embodiment as described in FIG. 3a.

Figure 1A:
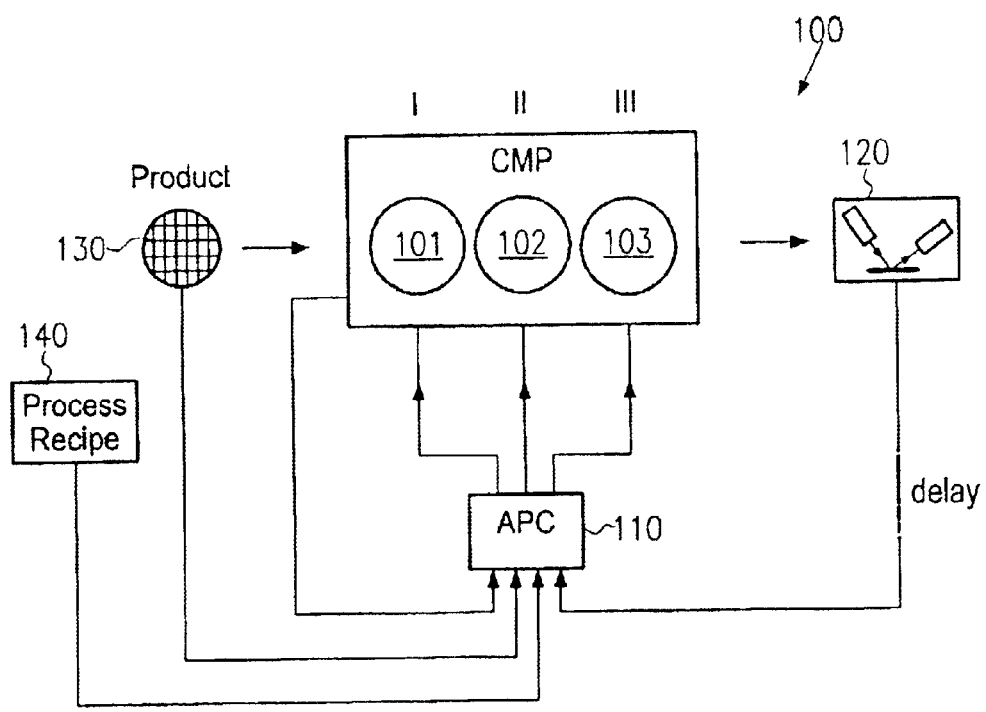
FIG. 1a schematically shows an exemplary prior art system for advanced process control.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Moreover, while the following embodiments exemplifying the concept of the present invention may be related to process control in manufacturing integrated circuits, it is to be noted that the present invention is applicable to any manufacturing process employing advanced process control.

With reference to the flowchart of FIG. 2, one illustrative embodiment of the present invention will now be described. For convenience, the process flow shown in FIG. 2 may be explained with reference to a process tool, such as is explained with reference to FIG. 1, wherein, however, it should be borne in mind that any reference to the CMP station 100 may not limit the present invention to a CMP process, but rather any other manufacturing sequence in the fabrication of integrated circuits or any other products is within the scope of this invention.

Figure 1B:
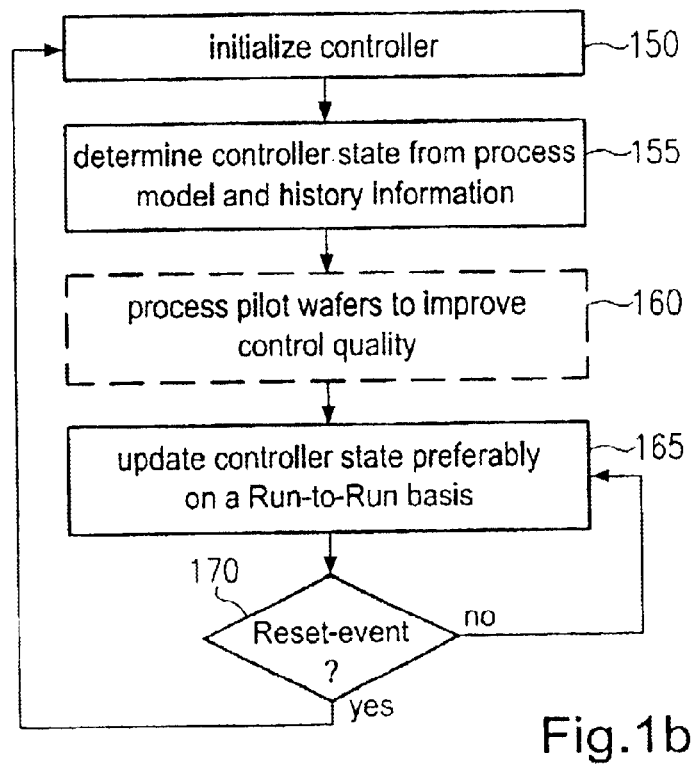
FIG. 1b is a flowchart describing a typical conventional process sequence.
Figure 3A:
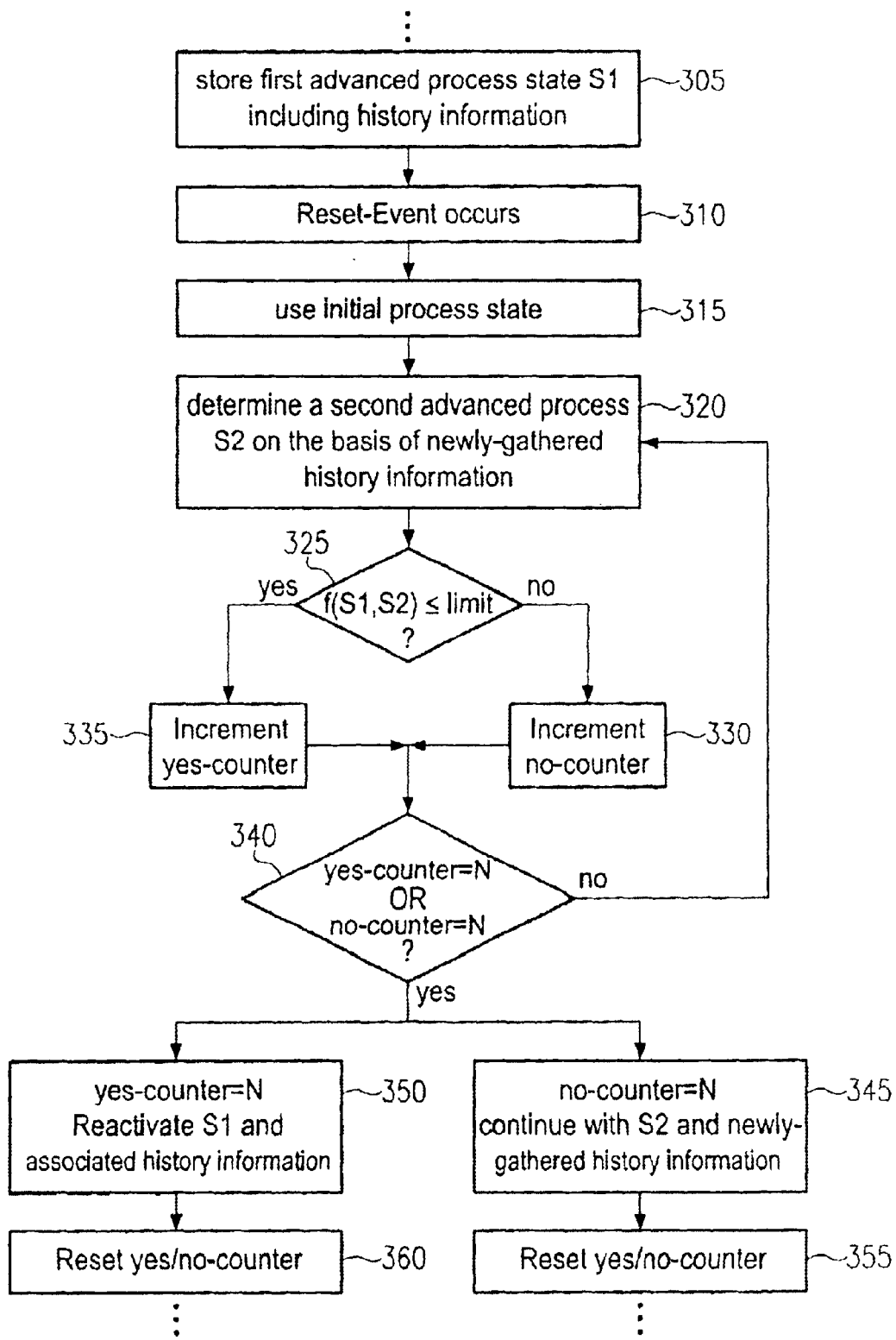
FIG. 3a is a flowchart illustrating one particular embodiment of the present invention, wherein assessing of process states after a reset event is depicted in more detail.
Figure 3B:
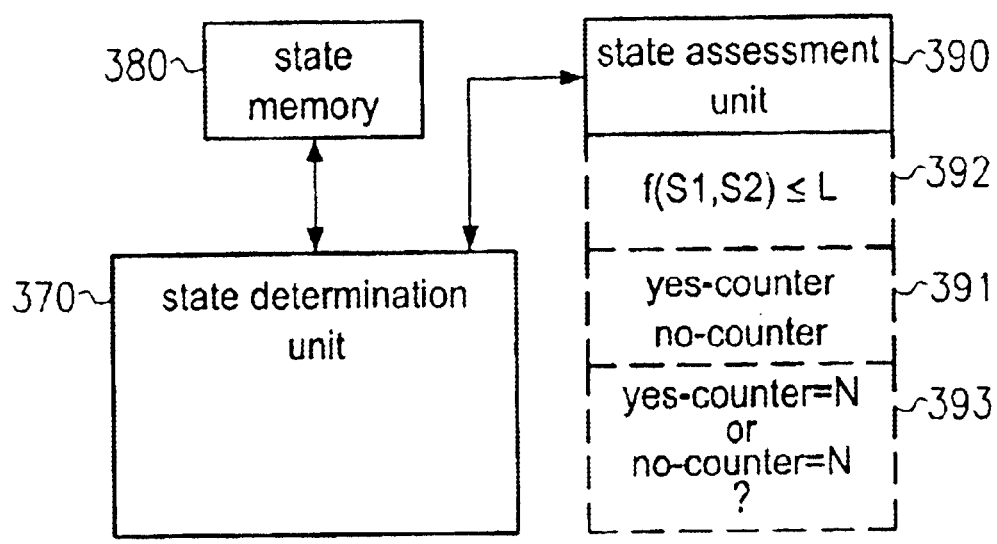

In step 200, a process controller, such as the controller described with reference to FIG. 3b, is initialized with an initial process state. This means the process controller, including a model of the process to be performed, such as the CMP process illustrated in FIGS. 1a–1b, is set to the initial state that is usually determined in advance and stored in the controller. The processing of a product or a group of products then starts with the initial state of the controller so that process parameters of the process tool used in the process are accordingly adjusted to be compatible with the initial state. That is, in the example of FIG. 1a, if the initial state predicts the capability of the CMP tool 100 so as to provide a certain removal rate, the controller will, for example, adjust the process time in the CMP station 100 in a manner to obtain the desired process result.

Next, in step 205, prior to processing a next product or a next group of products, the previously valid process state, for example, the initial process state of step 200, is updated to determine a new process state, which will be referred to as the first advanced process state. In determining the first advanced process state, the process model and history information supplied to the controller so far may be used. As previously pointed out, the history information may include any information relevant for the process to be performed, and may particularly include any measurement results or information indicating measurement results, any information regarding the process tool involved, information regarding the product to be processed, information regarding the type of process, which may be documented by the process recipe, and the like. It should be noted that the first advanced process state may include the history information in an implicit form, for example, when a process state is represented by one or more variables that are determined from the process model and the history information, or one or more pieces of the history information may explicitly be used to represent the advanced process state. As already pointed out, process quality, and thus accuracy, of the first advanced process state depends on, among other things, the amount of history information already gathered and, therefore, dummy products, such as pilot wafers in semiconductor manufacturing, may be subjected to the process under consideration prior to processing actual products. It should be noted that the first advanced process state preferably refers to a state being based on a long "process history" so that feedback from measurements has already taken place and control quality is improved.

In step 210, the first advanced process state is stored, whereby relevant history information is also stored, especially as it is required to determine the first advanced process state.

In step 215, it is assessed whether or not a reset event has taken place. As previously noted, any event in which relevant parameter values contained in the history information are outside of a respectively predefined value range may be assessed as a reset event. In this case, it is necessary to ensure that the reason for out of range parameters is rectified. It should be noted that, in addition to preventive maintenance, machine down times, and the like, also a variation of a process, for example, a significant variation in the process recipe caused, for example, by an altered process strategy, may represent a reset event. If in step 215 no reset event is detected, the process flow returns to step 205 and updates the first advanced process state. If in step 215 a reset event is detected, it is no longer ensured that the process model may predict the first advanced process state accurately and thus, according to step 220, a re-initialization of the controller is required.

In step 225, a second advanced process state is determined on the basis of the process model and the history information gathered after the reset event.

In step 230, the second advanced process state is assessed in comparison to the first advanced process state that has been stored in step 210. The assessment of the second advanced process state with reference to the first advanced process state may, for example, be carried out by numerically comparing one or more variables characterizing the process states.

In step 235, it is decided whether or not the result of the assessment of step 230 fulfills a predefined criterion. Thus, in step 235, it is assessed whether or not a predefined similarity between the first and the second advanced process state exists. If the result of the assessment does not fulfill the criterion, the process flow branches to step 240, at which process control is continued on the basis of the second advanced process state and the history information gathered after the reset event. If the result of the assessment does meet the criterion, the process flow branches to step 245. In step 245, process control is continued on the basis of the first advanced process state and, thus, on the basis of the history information included therein. Therefore, the further process control and the determination of further process states are based on the previously gathered history information so that a high degree of accuracy may be obtained even if a reset event has occurred.

In one particular embodiment, the process control is continued on the basis of the first and second advanced process states (as indicated in parentheses in step 245), and thus on the basis of the history information gathered prior and after the reset event. That means that an advanced process state updated after continuation of the process flow, as indicated in step 245, is a process state that includes the "experience" of the controller gained prior to the reset event and the history information obtained after the reset event that currently characterizes the process. Therefore, any valuable history information that relates to currently existing process conditions confirmed by measurement results is maintained and combined with the "reactivated" history information gathered prior to the reset event.

Figure 2:
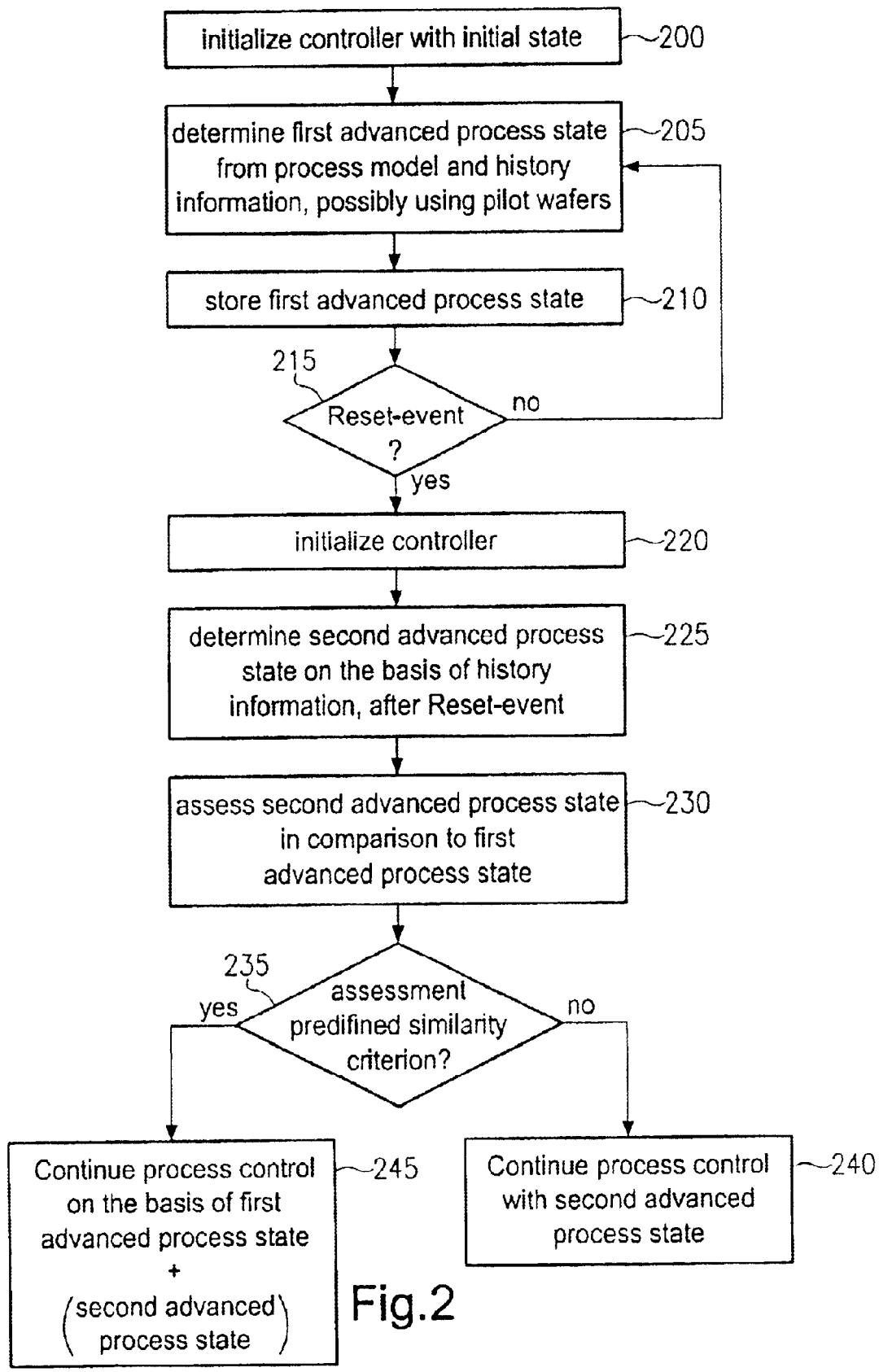
FIG. 2 is a flowchart describing one illustrative embodiment of the present invention.

FIG. 3a is a flowchart depicting a further illustrative embodiment of the present invention. For the sake of convenience, merely the relevant process steps are illustrated and the sequence in FIG. 3a starts with step 305, in which a first advanced process state S1, that may be determined in a similar manner as already pointed out with reference to FIG. 2, is stored along with any relevant history information.

In step 310, a reset event is detected and similarly as in the process flow of FIG. 2, in step 315, an initial process state is employed for the further process control. In step 320, a second advanced process state S2 is determined on the basis of newly gathered history information similarly as pointed out with reference to FIG. 2.

In step 325, it is assessed whether or not a relationship between the states S1 and S2 is within a predefined range. In FIG. 3a, the relationship is represented by a function $f(S1, S2)$ and the assessment may be carried out such that the function is within a predefined value range. For example, the function f may obey the equation $f(S1, S2) \leq limit$, wherein "limit" is a specified threshold. For example, the function may relate the variables representing the process states S1 and S2 to each other to yield a number that is then compared to the threshold value "limit." In one example, the process states S1 and S2 may be represented by single numbers, such as the removal rate in the CMP process of FIG. 1, and the absolute amount of the difference of S1 and S2 may represent the criterion for the decision in step 325, that is $|S1-S2| \leq limit$.

If the decision in step 325 is not within the specified range, i.e., the function f exceeds the threshold value "limit," in step 330, a "no-counter" is incremented. If, however, the decision in step 325 yields a "yes," in step 335, a "yes-counter" is incremented.

In step 340, it is assessed whether or not the yes-counter or the no-counter has reached a predefined threshold N, and if neither of the two counters is equal to N, the process flow returns to step 320 to update the second advanced process state S2. When the no-counter is equal to N, the process flow branches to step 345; whereas if the yes-counter is equal to N, the process flow branches to step 350.

In step 345, the control process continues by maintaining the process state S2 and the newly gathered history information, wherein in step 355 the yes-counter and the no-counter are reset. Accordingly, the decision made in step 325 has revealed that the reset event had a significant impact on one of the components involved in the process sequence so that a re-initialization has been necessary.

When the yes-counter, however, has reached the value N first, in step 350, the previously stored first advanced process state S1 and the associated history information are "reactivated" and replace the state S2 and the newly gathered history information, or, according to one particular embodiment, the reactivated first advanced process state S1 and the associated history information are merged or combined with the state S2 and the newly gathered history information, so that the valuable information regarding the process after the reset event is preserved. Thus, the process control may be continued with a merged state S3 including the history information of S1 and S2.

In step 360, the yes-counter and the no-counter are reset and the further process sequence is continued, additionally or exclusively, on the basis of the previously gathered history information. Thus, the decision in step 325 has revealed that a sufficient degree of similarity between the control sequence prior to the reset event and the control sequence after the reset event exists so that the reset event did not significantly influence the behavior of the system to be controlled. Thus, the accuracy of the control sequence after the reset event rapidly converges, especially when the previously-gathered and the newly-gathered history information are used in combination, since from now on the process states will again be based on a great amount of "experience" of the controller gained prior to the reset event and possibly after the reset event.

Consequently, the present invention allows an advanced process controller to reliably maintain within process specification after the occurrence of a reset event, since as in conventional processing, the system is re-initialized to ensure predictable start conditions; wherein, however, contrary to conventional processing, the impact of the reset event on the control procedure is estimated by comparing the process state prior to the occurrence of the reset event with the newly obtained process states. In the above explained embodiments, the degree of similarity between the advanced process states S1 and S2 may be adjusted by correspondingly electing the threshold value "limit" and/or by correspondingly selecting the value N.

While the value "limit" qualifies the degree of similarity of the states S1 and S2, the value N specifies the "speed" of convergence for the degree of similarity qualified by "limit." In one embodiment, the type of reset event and the corresponding criteria used for the estimation, for example, the values "limit" and N, may be a part of the history information. Accordingly, upon the occurrence of a similar reset event, the associated estimation criteria may be tightened or may even become completely obsolete. For example, if a change of a process recipe has resulted, after the re-initialization of the process controller in a continuation of the control process with the previously gathered history information with a specified value "limit" and with an N equal to, e.g., three, N may be set to 1 upon occurrence of a further change of the process recipe during the following control sequence. If at a later time a further change of the process recipe is necessary, the process sequence may then assess this change as not being a reset event so as to completely avoid any re-initialization during the process. The same holds true for any other reset event, such as preventive maintenance, a machine failure, and the like. In this way, by storing and evaluating the estimation criteria, such as "limit" and N, the process controller may "learn" to assess reset events.

FIG. 3b schematically shows a block diagram depicting an illustrative embodiment of a process control architecture that may be used in the embodiments as described with reference to FIGS. 2 and 3a. A process controller 300 includes a state determination unit 370 in which a process model may be implemented and which is adapted to receive any history information that is relevant for establishing a process state for an advanced process control. Moreover, the state determination unit 370 may be adapted to adjust one or more process parameters of one or more process tools employed in the process or processes under consideration. Regarding the type of process tools and the type of processes to be controlled, the same criteria as explained with reference to FIG. 1 also apply in this case. The state determination unit 370 is operatively connected with a state memory 380 that is configured to store at least one currently valid process state and the relevant history information. Moreover, the state determination unit 370 is operatively coupled to a state assessment unit 390 that is configured to assess one or more currently valid process states with respect to the at least one process state stored in the state memory 380.

In one embodiment, the state assessment unit 390 may comprise a counter section 391 including at least one yes-counter and/or at least one no-counter. Moreover, the state assessment unit 390 may comprise a state comparator section 392 and a counter comparator section 393. This embodiment is particularly advantageous in carrying out the process sequence as described with reference to FIG. 3a. The process controller 300 may be implemented in any appropriate work station or may be provided as individual controller units provided at the process tool. Additionally, the process controller 300 may also be implemented in a facility management system, or the process controller 300 may be adapted to communicate with a facility management system so that a plurality of process sequences may be coordinated and controlled by the commanding facility management system.

In the embodiments described so far, the process control is designed so as to establish a single currently valid process state for controlling one process tool in which one type of product is to be processed according to one specified process, i.e., process recipe. The process controller and the control sequence may, however, be designed to control a plurality of process tools processing different types of products according to different process recipes.

Figure 4A:
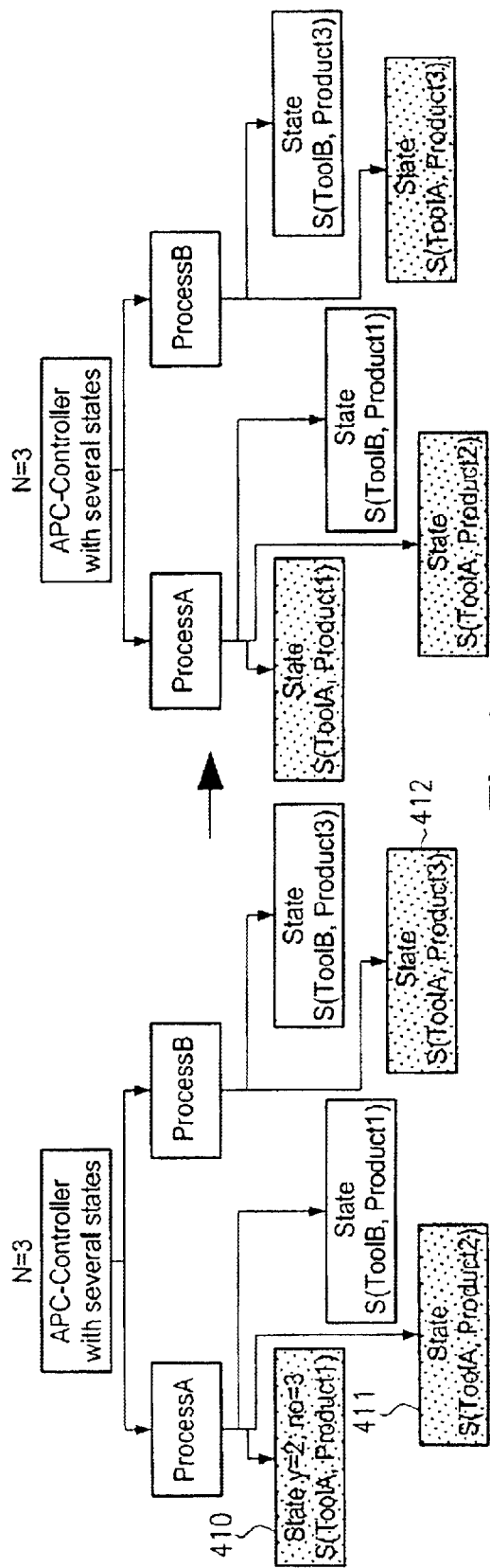
FIGS. 4a–4b are block diagrams schematically depicting the effect of the present invention when applied to a typical APC strategy.
Figure 4B:
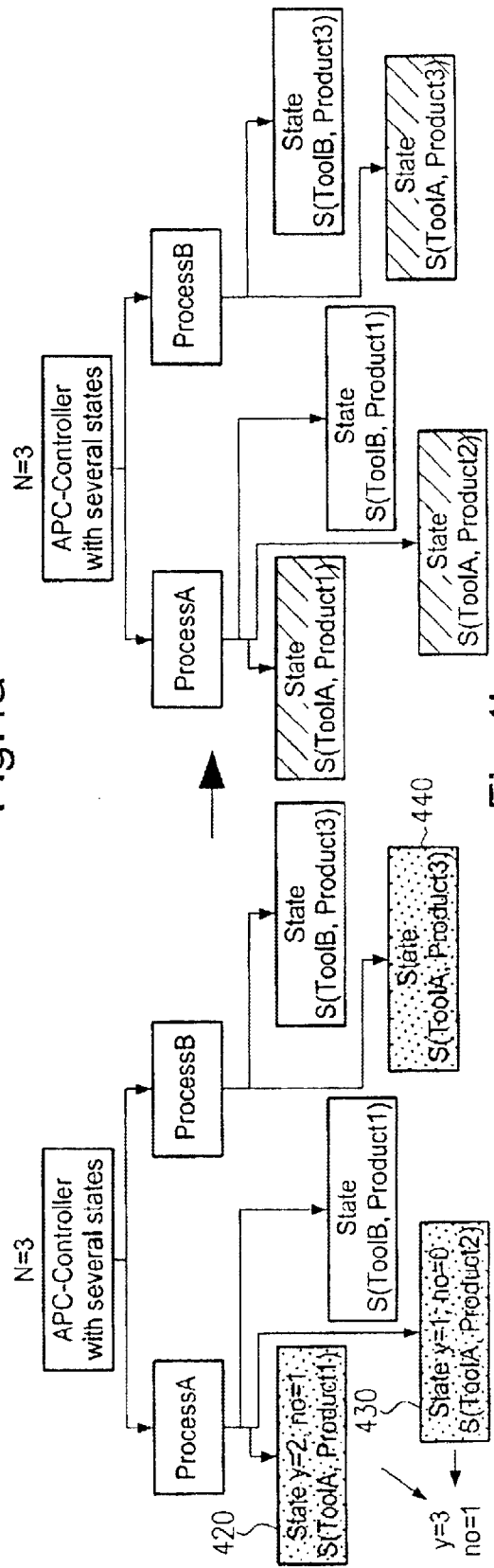

With reference to FIGS. 4a–4b, one illustrative embodiment will now be described, in which a process controller determines process states according to two different processes, referred to as process A and process B, for three different types of products, referred to as product 1, product 2 and product 3, that are processed in two different process tools, referred to as tool A and tool B. Moreover, in this process sequence, process control is carried out on the basis of groups of products, i.e., a measurement result may refer to a group of products, thus may represent a mean value taken over the entire group, and the parameter adjustment of the process tools may be carried out for the group for products.

In FIGS. 4a–4b, the process controller has already carried out the process control for a certain time period and has established, on the basis of corresponding process models and history information gathered in this time period, presently valid control states denoted as (tool A, product 1, process A), (tool A, product 2, process A), (tool B, product 3, process B) and (tool A, product 3, process B). These states and their relevant history information have been stored, similarly as described with reference to FIGS. 2 and 3. It is now assumed that a reset event has occurred concerning process tool A, such as preventive maintenance, so that the re-initialization of states related to tool A is necessary.

The left-hand side of FIG. 4a now shows the situation after the corresponding states have been updated five times after the reset event concerning tool A has occurred. Accordingly, two types of states exist, one type, shown in white boxes in FIG. 4a, has not been concerned by the re-initialization and represents states of high accuracy due to the large amount of history information which these states are based on. The other type of states concerning tool A, depicted in dotted boxes and denoted as 410, 411, 412, respectively, represents states with reduced accuracy, since these states are only updated for the fifth time and are accordingly based on newly gathered history information. As indicated by the state 410, an estimation regarding the degree of similarity of the process state based on the newly gathered history information in comparison to the stored process states based on the previous history information has been carried out five times, for instance in a manner as described with reference to FIG. 3a. The results of the estimation are indicated by Y=2, No=3, that is five groups of product 1 processed by tool A have met the similarity criterion two times, but failed three times. It is further assumed that the decision is completed when either passing or failing the test has occurred three times. For instance, in the embodiments described with reference to the flowchart of FIG. 3*a*, in step 340, N is set to 3. Thus, the process controller continues the process sequence with states as indicated at the right-hand side of FIG. 4*a*, wherein now all states have become "regular" states for further process control. Since the number of Nos has reached the predefined threshold N first, the requirement for a reset is confirmed.

In the left-hand side of FIG. 4*b*, it is assumed that of the three types of products processed by tool A, three groups of product 1 and one group of product 2 have been analyzed and history information for those products is fed to the process controller, while products 3 have not been subjected to the comparison to previous process states. These states are denoted as 420, 430 and 440, respectively. Data analysis revealed that of the three groups of product 1 processed by tool A with process A, two groups passed the test while one failed. On the other hand, the group of product 2 processed by tool A according to process A passed the test, i.e., met the criterion as given, for example, in step 325 of FIG. 3*a*. Since the sum of the yes-counters is equal to 3, and thus the similarity criterion is fulfilled, all of the dotted states, i.e., the states with reduced accuracy, may be replaced by corresponding process states that are a combination of the states stored prior to the reset event and the presently valid states 420, 430 and 440, respectively. These states are depicted in hatched boxes in FIG. 4*b*. Accordingly, the process sequence will be continued on the basis of these states and the previously and presently acquired history information so that process control for tool A will rapidly reach a high degree of accuracy. Thus, a reset of the process controller is not necessary. In one embodiment, the states depicted on the right-hand side of FIG. 4*b*, may exclusively be based on the previously stored states without using the states 420, 430 and 440 including the newly-gathered history information.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for advanced process control for processing a plurality of products using a process tool, the method comprising:

determining an initial process state;

determining a first advance process state on the basis of said initial process state, a process model and history information, the history information including information related to at least one of the process tool, a process recipe and the product;

storing the first advanced process state;

re-initializing the advanced process control to use said initial process state after occurrence of a reset event;

determining a second advanced process state on the basis of said initial process state and history information gathered after said reset event;

assessing said second advanced process state in comparison to said first advance process state; and continuing process control on the basis of at least one of the first and second process states based on said assessment.

2. The method of claim 1, wherein storing said first advanced process state includes storing at least one piece of history information related to said first advanced process state.

3. The method of claim 1, wherein determining said first advanced process state includes updating said initial process state at least a plurality of times on the basis of said process model and history information.

4. The method of claim 1, wherein assessing said second advanced process state includes updating said second advanced process state for a predefined number of times on the basis of said process model and history information gathered after said reset event.

5. The method of claim 1, wherein the second advanced process state is replaced by the first advanced process state when a result of said assessment fulfills a predefined similarity criterion.

6. The method of claim 1, wherein the second advanced process state is replaced by a combination of the first advanced process state and the second advanced process state when a result of said assessment fulfills a predefined similarity criterion.

7. The method of claim 5, wherein said history information gathered prior to the reset event replaces the history information gathered after said reset event.

8. The method of claim 6, wherein said history information gathered prior to the reset event is combined with the history information gathered after said reset event.

9. The method of claim 1, wherein assessing said second advanced process state includes representing said first and second advanced process states each as mathematical objects and defining, in advance, a mathematical relationship between said first advanced process state and said second advanced process state, and evaluating said predefined mathematical relationship.

10. The method of claim 9, wherein said mathematical relationship is represented by a single number and said mathematical relationship includes comparing said single number with at least one threshold value.

11. The method of claim 1, further comprising assessing said reset event and storing a result of said assessment as part of said history information.

12. The method of claim 11, wherein the step of assessing said second advanced process state is carried out on the basis of said assessment result concerning the reset event.

13. The method of claim 1, wherein a plurality of initial process states and a corresponding plurality of first advanced process states is determined and wherein at least one second advanced process state is determined corresponding to a specific one of said plurality of first advanced process states.

14. The method of claim 1, wherein said reset event is comprised of at least one of preventive maintenance, a process tool failure, a change in the product to be processed and a change in the process to be performed.

15. A method of controlling a manufacturing process sequence for a plurality of products performed with a process tool, the manufacturing process sequence including a reset event, the method comprising:

providing a model for said manufacturing process sequence;

gathering information related to at least one of said manufacturing process sequence, said process tool and the products;

determining, on the basis of said model and said information, an initial process state that quantitatively estimates an effect of said manufacturing process sequence on said product;

updating said initial process state on the basis of said model and said information to establish a first advanced process state;

storing said gathered information;

continuing process control with said initial process state after occurrence of said reset event;

updating said initial process state on the basis of said model and information gathered after the reset event in order to establish a second advanced process state; and combining the information gathered after the reset event with said stored information when a specified correlation between the first advanced process state and the second advanced process state fulfills a predefined condition, and continuing the control sequence with the second advanced process state when said specified correlation fails to fulfill said predefined condition.

16. The method of claim 15, wherein storing said information includes storing the first advanced process state.

17. The method of claim 15, wherein establishing said first advanced process state includes updating said initial process state at least a plurality of times on the basis of said process model and history information.

18. The method of claim 15, wherein said combining the information gathered after the reset event with said stored information occurs when said correlation between the first advanced process state and the second advanced process state fulfills said predefined condition a predefined number of times.

19. The method of claim 15, wherein the second advanced process state is replaced by the first advance process state when said correlation between the first advanced process state and the second advanced process state fulfills said predefined condition.

20. The method of claim 15, wherein the second advanced process state is replaced by a combination of the first advanced process state and the second advanced process state when said correlation between the first advanced process state and the second advanced process state fulfills said predefined condition.

21. The method of claim 15, wherein said correlation is represented by a mathematical relationship between said first advanced process state and said second advanced process state.

22. The method of claim 15, further comprising assessing said reset event and storing a result of said assessment as part of said history information.

23. The method of claim 15, wherein a plurality of initial process states and a corresponding plurality of first advanced process states is determined and wherein at least one second advanced process state is determined corresponding to a specific one of said plurality of first advanced process states.

24. An advanced process controller for controlling a process in producing a plurality of products, comprising:

a history information unit configured to receive and store history information including information related to at least one of the process tool, the process sequence and the products;

a state determination unit configured to determine a process state on the basis of a process model and said history information;

a state memory configured to store at least one process state; and a state assessment unit configured to assess a currently valid process state to a process state stored in said state memory based upon a predefined similarity criterion;

wherein said advance process controller is further configured to re-initialize the advanced process control to an initial state after the occurrence of a reset event and determine a second advanced process control state on the basis of the initial process data and historical information gathered after the reset event.

25. The advanced process controller of claim 24, further comprising a counter section including a least one counter for counting at least one of a number indicating positive assessment results and a number indicating negative assessment results.

26. The advanced process controller of claim 25, further comprising a state evaluation section configured to evaluate a mathematical function of a currently valid process state and a process state stored in said state memory.

27. The advanced process controller of claim 26, further comprising a counter comparing section configured to compare the counter contents of the at least one counter with a predefined value.

28. A method for advanced process control for processing a plurality of products using a process tool, the method comprising:

determining an initial process state;

determining a first advance process state on the basis of said initial process state, a process model and history information, the history information including information related to at least one of the process tool, a process recipe and the product;

storing the first advanced process state;

re-initializing the advanced process control to use said initial process state after occurrence of a reset event;

determining a second advanced process state on the basis of said initial process state and history information gathered after said reset event;

assessing said second advanced process state in comparison to said first advance process state, wherein assessing said second advanced process state includes updating said second advanced process state for a predefined number of times on the basis of said process model and history information gathered after said reset event and wherein the second advanced process state is replaced by said first advanced process state when a predefined number of updated versions of said second advanced process state fulfills a predefined similarity criterion; and continuing process control on the basis of at least one of the first and second process states based on said assessment.

29. A method for advanced process control for processing a plurality of products using a process tool, the method comprising:

determining an initial process state;

determining a first advance process state on the basis of said initial process state, a process model and history information, the history information including information related to at least one of the process tool, a process recipe and the product;

storing the first advanced process state;

re-initializing the advanced process control to use said initial process state after occurrence of a reset event;

determining a second advanced process state on the basis of said initial process state and history information gathered after said reset event;

assessing said second advanced process state in comparison to said first advance process state, wherein assessing said second advanced process state includes updating said second advanced process state for a predefined number of times on the basis of said process model and history information gathered after said reset event and wherein the second advanced process state is replaced by a combination of said first advanced process state and said second advanced process state when a predefined number of updated versions of said second advanced process state fulfills a predefined similarity criterion; and continuing process control on the basis of at least one of the first and second process states based on said assessment.

30. A method for advanced process control for processing a plurality of products using a process tool, the method comprising:

determining an initial process state;

determining a first advance process state on the basis of said initial process state, a process model and history information, the history information including information related to at least one of the process tool, a process recipe and the product;

storing the first advanced process state;

re-initializing the advanced process control to use said initial process state after occurrence of a reset event;

determining a second advanced process state on the basis of said initial process state and history information gathered after said reset event;

assessing said second advanced process state in comparison to said first advance process state, wherein assessing said second advanced process state includes updating said second advanced process state for a predefined number of times on the basis of said process model and history information gathered after said reset event and wherein assessing said second advanced process state includes incrementing a counter when one of the second advanced process state and an updated version thereof fulfills a predefined similarity criterion; and continuing process control on the basis of at least one of the first and second process states based on said assessment.

31. A method for advanced process control for processing a plurality of products using a process tool, the method comprising:

determining an initial process state;

determining a first advance process state on the basis of said initial process state, a process model and history information, the history information including information related to at least one of the process tool, a process recipe and the product;

storing the first advanced process state;

re-initializing the advanced process control to use said initial process state after occurrence of a reset event;

determining a second advanced process state on the basis of said initial process state and history information gathered after said reset event;

assessing said second advanced process state in comparison to said first advance process state, wherein assessing said second advanced process state includes updating said second advanced process state for a predefined number of times on the basis of said process model and history information gathered after said reset event and wherein assessing said second advanced process state includes incrementing a no-counter when one of said second advanced process state and an updated version thereof fails to fulfill a predefined similarity criterion; and continuing process control on the basis of at least one of the first and second process states based on said assessment.

32. A method for advanced process control for processing a plurality of products using a process tool, the method comprising:

determining an initial process state;

determining a first advance process state on the basis of said initial process state, a process model and history information, the history information including information related to at least one of the process tool, a process recipe and the product;

storing the first advanced process state;

re-initializing the advanced process control to use said initial process state after occurrence of a reset event;

determining a second advanced process state on the basis of said initial process state and history information gathered after said reset event;

assessing said second advanced process state in comparison to said first advance process state, wherein assessing said second advanced process state includes updating said second advanced process state for a predefined number of times on the basis of said process model and history information gathered after said reset event and wherein assessing said second advanced process state includes incrementing a yes-counter when one of said second advanced process states and an updated version thereof meets said similarity criterion, and incrementing a no-counter when one of said second advanced process state and an updated version thereof fails to fulfill a predefined similarity criterion; and continuing process control on the basis of at least one of the first and second process states based on said assessment.

33. The method of claim 32, wherein process control is continued with the first advanced process state when said yes-counter reaches a predefined threshold and the no-counter number is less than the yes-counter number, and wherein process control is continued with the second advanced process state, when the no-counter reaches said predefined threshold and the yes-counter number is less than the no-counter number.

34. The method of claim 32, wherein process control is continued with a combination of the first advanced process state and the second advanced process state when said yes-counter reaches a predefined threshold and the no-counter number is less than the yes-counter number, and wherein process control is continued with the second advanced process state, when the no-counter reaches said predefined threshold and the yes-counter number is less than the no-counter number.

35. A method of controlling a manufacturing process sequence for a plurality of products performed with a process tool, the manufacturing process sequence including a reset event, the method comprising:

providing a model for said manufacturing process sequence;

gathering information related to at least one of said manufacturing process sequence, said process tool and the products;

determining, on the basis of said model and said information, an initial process state that quantitatively estimates an effect of said manufacturing process sequence on said product;

updating said initial process state on the basis of said model and said information to establish a first advanced process state;

storing said gathered information;

continuing process control with said initial process state after occurrence of said reset event;

updating said initial process state on the basis of said model and information gathered after the reset event in order to establish a second advanced process state; and combining the information gathered after the reset event with said stored information when a specified correlation between the first advanced process state and the second advanced process state fulfills a predefined condition, and continuing the control sequence with the second advanced process state when said specified correlation fails to fulfill said predefined condition, wherein a yes-counter is incremented when said predefined condition is fulfilled.

36. A method of controlling a manufacturing process sequence for a plurality of products performed with a process tool, the manufacturing process sequence including a reset event, the method comprising:

providing a model for said manufacturing process sequence;

gathering information related to at least one of said manufacturing process sequence, said process tool and the products;

determining, on the basis of said model and said information, an initial process state that quantitatively estimates an effect of said manufacturing process sequence on said product;

updating said initial process state on the basis of said model and said information to establish a first advanced process state;

storing said gathered information;

continuing process control with said initial process state after occurrence of said reset event;

updating said initial process state on the basis of said model and information gathered after the reset event in order to establish a second advanced process state; and combining the information gathered after the reset event with said stored information when a specified correlation between the first advanced process state and the second advanced process state fulfills a predefined condition, and continuing the control sequence with the second advanced process state when said specified correlation fails to fulfill said predefined condition, wherein a no-counter is incremented when said predefined condition is not fulfilled.

37. A method of controlling a manufacturing process sequence for a plurality of products performed with a process tool, the manufacturing process sequence including a reset event, the method comprising:

providing a model for said manufacturing process sequence;

gathering information related to at least one of said manufacturing process sequence, said process tool and the products;

determining, on the basis of said model and said information, an initial process state that quantitatively estimates an effect of said manufacturing process sequence on said product;

updating said initial process state on the basis of said model and said information to establish a first advanced process state;

storing said gathered information;

continuing process control with said initial process state after occurrence of said reset event;

updating said initial process state on the basis of said model and information gathered after the reset event in order to establish a second advanced process state; and combining the information gathered after the reset event with said stored information when a specified correlation between the first advanced process state and the second advanced process state fulfills a predefined condition, and continuing the control sequence with the second advanced process state when said specified correlation fails to fulfill said predefined condition, wherein a yes-counter is incremented when said predefined condition is fulfilled by the correlation of one of said second advanced process state and an updated version thereof and the first advanced process state, and a no-counter is incremented when said predefined condition is not fulfilled by the correlation of one of said second advanced process state and an updated version thereof and the first advanced process state.

38. The method of claim 37, wherein process control is continued with the first advanced process state when said yes-counter reaches a predefined threshold and the no-counter number is less than the yes-counter number, and wherein process control is continued with the second advanced process state, when the no-counter reaches said predefined threshold and the yes-counter number is less than the no-counter number.

39. The method of claim 37, wherein process control is continued with a combination of the first advanced process state and the second advanced process state when said yes-counter reaches a predefined threshold and the no-counter number is less than the yes-counter number, and wherein process control is continued with the second advanced process state, when the no-counter reaches said predefined threshold and the yes-counter number is less than the no-counter number.

40. A method of controlling a manufacturing process sequence for a plurality of products performed with a process tool, the manufacturing process sequence including a reset event, the method comprising:

providing a model for said manufacturing process sequence;

gathering information related to at least one of said manufacturing process sequence, said process tool and the products;

determining, on the basis of said model and said information, an initial process state that quantitatively estimates an effect of said manufacturing process sequence on said product;

updating said initial process state on the basis of said model and said information to establish a first advanced process state;

storing said gathered information;

continuing process control with said initial process state after occurrence of said reset event;

updating said initial process state on the basis of said model and information gathered after the reset event in order to establish a second advanced process state; and combining the information gathered after the reset event with said stored information when a specified correlation between the first advanced process state and the second advanced process state fulfills a predefined condition, and continuing the control sequence with the second advanced process state when said specified correlation fails to fulfill said predefined condition, wherein said correlation is represented by a mathematical relationship that is represented by a single number and said mathematical relationship includes comparing said single number with at least one threshold value.

* * * * *